United States Patent
Berger (10) Patent No.: US 7,016,921 B1
(45) Date of Patent: Mar. 21, 2006

(54) METHOD, ARRANGEMENT AND SET OF A PLURALITY OF ARRANGEMENTS FOR REMEDYING AT LEAST ONE INCONSISTENCY IN A GROUP OF DATABASES WHICH COMPRISES A DATABASE AND AT LEAST ONE COPY DATABASE OF THE DATABASE

(75) Inventor: Michael Berger, Höhenkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/744,225

(22) PCT Filed: Jul. 1, 1999

(86) PCT No.: PCT/DE99/01999

§ 371 (c)(1),
(2), (4) Date: Jan. 22, 2001

(87) PCT Pub. No.: WO00/07116

PCT Pub. Date: Feb. 10, 2000

(30) Foreign Application Priority Data

Jul. 27, 1998 (DE) ................................ 198 33 778

(51) Int. Cl.
*G06F 17/30* (2006.01)
(52) U.S. Cl. ..................... 707/201; 707/203; 707/204
(58) Field of Classification Search ............... 707/201, 707/203, 204
See application file for complete search history.

(56) References Cited

U.S. PATENT DOCUMENTS

| 5,613,079 | A | * | 3/1997 | Debique et al. ............. 711/141 |
| 5,806,074 | A | * | 9/1998 | Souder et al. ............... 707/201 |
| 5,926,816 | A | * | 7/1999 | Bauer et al. .................... 707/8 |
| 6,058,401 | A | * | 5/2000 | Stamos et al. ............... 707/201 |
| 6,367,077 | B1 | * | 4/2002 | Brodersen et al. .......... 717/170 |
| 6,532,480 | B1 | * | 3/2003 | Boothby ...................... 707/201 |

FOREIGN PATENT DOCUMENTS

| DE | 196 07 132 A1 | 8/1997 |
| EP | 0 663 640 A1 | 7/1995 |
| EP | 0 716 385 | 6/1996 |

OTHER PUBLICATIONS

Terry et al., "Managing Update Conflicts in Bayou, a Weakly Connected Replicated Storage System", ACM SIGOPS Operating System Overview, vol. 29 issue 5, Dec. 1995.*

(Continued)

*Primary Examiner*—Mohammad Ali
*Assistant Examiner*—Khanh Pham
(74) *Attorney, Agent, or Firm*—Staas & Halsey LLP (57) ABSTRACT

To eliminate at least one inconsistency in a database collection containing a database and at least one copy database of the database, which inconsistency arises on account of the data in the database or in the copy database being changed, at least some of the operations which can create an inconsistency are allocated to defined conflict types. Each conflict type is allocated a decision set which is used to indicate possible decisions which can be used to eliminate an inconsistency created by an operation of the respective conflict type. The inconsistency is eliminated using the decision set. Error-free elimination of inconsistencies is ensured by matching the decision set to the respective situation.

19 Claims, 4 Drawing Sheets

OTHER PUBLICATIONS

Date C J: "Distributed Databases", US, Reading, Additson Wesley, (1985) pp. 291-340—XP 002016220.

Rothnie J B Jr., Introduction to a System for Distributed Databases (SDD-1) (1980) XP 00747926, pp. 1-17.

Muth, Peter et al., Semantic Concurrency Control in Object-Oriented Database Systems, XP 000380184 (1993), pp. 233-242.

* cited by examiner

| | ES1 | ES2 | ES3 | ES4 | ES5 | ES6 | ES7 | ES8 | ES9 | ES10 | ES11 | ES12 | ES13 | ES14 | ES15 | ES16 | ES17 | ES18 | ES19 | ES20 | ES21 | ES22 |
| | H K1 | H K2 | H K3 | H K4 | H K5 | H K6 | H K7I | H K7II | H K8I | H K8II | H K9 | H K10 | H K11 | K K1 | K K2 | K K3 | K K4 | K K5I | K K5II | K K6 | K K7 | K K8 |
|---|---|---|---|---|---|---|---|---|---|---|---|---|---|---|---|---|---|---|---|---|---|---|
| E1 | x | x | x | x | x | x | x | x | x | x | x | x | x | | | | | | | | | |
| E2 | x | x | x | x | x | x | x | x | x | x | x | x | x | | | | | | | | | |
| E3a | | | | | | | | | | | | | | x | x | x | x | x | x | x | x | x |
| E3b | | | | | | | | | | | | | | x | x | x | x | x | x | x | x | x |
| E4 | | | | | | | | (x) | | x | | | | | | | | | | | | |
| E5a | | | | | | | | | | | | | | | | | | | x | | | |
| E5b | | | | | | | | | | | | | | | | | | | x | | | |
| E6 | x | x | x | x | x | x | x | x | x | x | x | | x | x | x | x | x | x | x | x | x | x |

METHOD, ARRANGEMENT AND SET OF A PLURALITY OF ARRANGEMENTS FOR REMEDYING AT LEAST ONE INCONSISTENCY IN A GROUP OF DATABASES WHICH COMPRISES A DATABASE AND AT LEAST ONE COPY DATABASE OF THE DATABASE

BACKGROUND OF THE INVENTION

1. Field of the Invention

The invention relates to a method, an arrangement and a set of a plurality of arrangements for eliminating at least one inconsistency in a database collection containing a database and at least one copy database of the database.

2. Description of the Related Art

Such a method is disclosed in German patent document DE 196 07 132 A1 ('132) in which computers communicate with one another via a communication network (e.g., a data network, a radio network or else a conventional telephone network) using a communication protocol. A communication protocol means a protocol for stipulating the data format used for communication between computers. An exemplary communication protocol is the Transport Control Protocol/Internet Protocol (TCP/IP).

In the method in '132, a first computer stores a database and each further computer stores a copy of the database, called copy database below. The database and the copy databases are modified by a respective computer during a session, i.e., the data contained in the database or in a copy database, or the structure of this data, is modified. In this context, a database means a hierarchical or else object-oriented database, for example. A database contains data which is stored in accordance with a prescribed structure and is interrelated. Each object, i.e., each data record within the database, is usually unambiguously identifiable by means of an identifier.

Changes to a copy database are sometimes made without the same change also being made in the database itself, or else vice versa. If a consistent database is intended to be created from the respective copy database and the database, then it is necessary to ascertain and eliminate any inconsistency arising as a result of the data, or the structure of said data, being added, removed or changed. An inconsistency means any syntactical difference within a copy database and the database, i.e., any discrepancies arising in the copy databases and the database between the data elements contained in the database and a copy database, the properties of these data elements and their relationships with one another. '132 indicates various options for eliminating such an inconsistency.

SUMMARY OF THE INVENTION

The invention addresses the problem by specifying another method and another apparatus for eliminating inconsistencies in a database collection which allows an inconsistency to be eliminated while saving as much computation time as possible.

The problem is solved by the method, by the arrangement, and by the set of a plurality of arrangements configured to implement the following steps: changing the database or the at least one copy database, thereby producing an inconsistency;

allocating at least some operations which create an inconsistency to defined conflict types; allocating each conflict type a decision set which is used to indicate possible decisions which can be used to eliminate an inconsistency created by at least one operation of the respective conflict type; and eliminating the inconsistency utilizing the decision set.

The method for the computer-aided elimination of at least one inconsistency in a database collection containing a database and at least one copy database of the database, which inconsistency arises due to a change in the database and/or in the copy database, has the following steps:

a) at least some of the operations which can create an inconsistency are allocated to defined conflict types,
b) each conflict type is allocated a decision set which is used to indicate possible decisions which can be used to eliminate an inconsistency created by at least one operation of the respective conflict type, and
c) the inconsistency is eliminated using the decision set.

The arrangement for eliminating at least one inconsistency in a database collection containing a database and at least one copy database of the database, which inconsistency arises due to the data in the database or in the copy database being changed, has at least one processor which is set up such that the following steps can be carried out:

a) at least some of the operations which can create an inconsistency are allocated to defined conflict types,
b) each conflict type is allocated a decision set which is used to indicate possible decisions which can be used to eliminate an inconsistency created by an operation of the respective conflict type, and
c) the inconsistency is eliminated using the decision set.

The set of a plurality of arrangements for eliminating at least one inconsistency in a database collection containing a database and at least one copy database of the database, which inconsistency arises due to the database and/or the copy database being changed, contains a plurality of arrangements, each of which has at least one processor which is set up such that the following steps can be carried out:

a) at least some of the operations which can create an inconsistency are allocated to defined conflict types,
b) each conflict type is allocated a decision set which is used to indicate possible decisions which can be used to eliminate an inconsistency created by at least one operation of the respective conflict type, and
c) the inconsistency is eliminated using the decision set.

The arrangements can be coupled to one another.

The invention makes it possible to generically resolve an inconsistency in a complex database. Preferred developments of the invention are described below.

In one preferred embodiment, a plurality of inconsistencies are eliminated. Preferably, in a further embodiment, each conflict type is allocated a decision set which is used to indicate possible decisions which can be used to eliminate an inconsistency created by a plurality of operations of the respective conflict type. In addition, in one development, the database collection contains a plurality of copy databases of the database.

For the purposes of simplification and hence to save computation time when eliminating an inconsistency, one embodiment of the invention provides for all inconsistencies and their dependencies on one another to be ascertained before elimination. A further saving of the computation time required to eliminate a plurality of inconsistencies is achieved in a further embodiment by virtue of the decision set for at least one conflict type being modified during elimination of the inconsistencies. In this context, the respective decision set is preferably changed on the basis of dependencies of the inconsistencies.

In one preferred embodiment, after a prescribable number of eliminated inconsistencies, the database collection is examined for further inconsistencies and their dependency. In one embodiment, the database collection preferably contains an object-oriented database. Finally, the method may be used within the context of object-oriented software development or else in the context of creating a structured electronic document.

BRIEF DESCRIPTION OF THE DRAWINGS

An illustrative embodiment of the invention is shown in the figures and is explained in more detail below.

DESCRIPTION OF THE PREFERRED EMBODIMENTS

Figure 2:
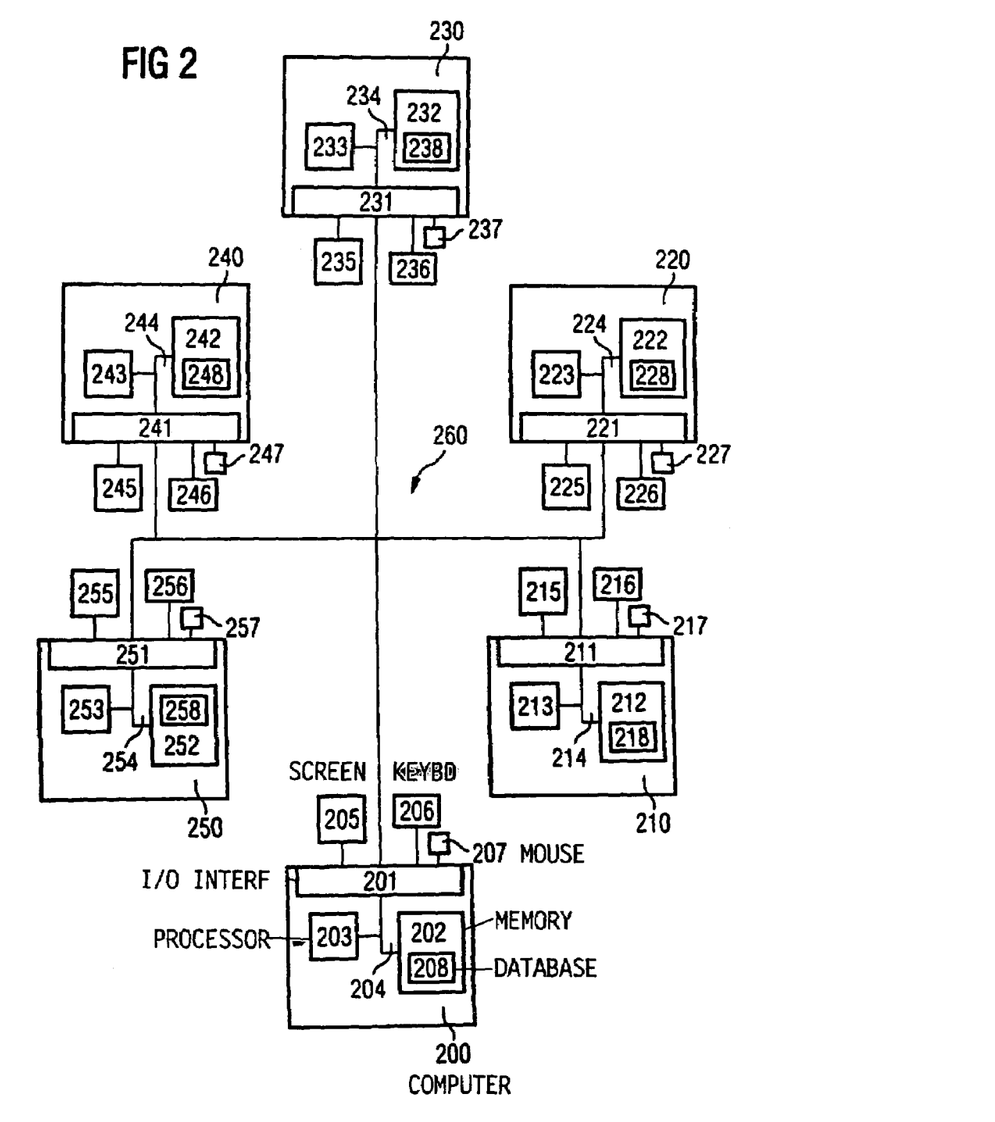
FIG. 2 is a block diagram showing computers connected to one another via a communication network.

FIG. 2 shows a first computer 200 having a memory 202 and a processor 203 which are connected to one another and to an input/output interface 201 via a bus 204 in each case. The input/output interface 201 is used to connect the first computer 200 to a screen 205, to a keyboard 206, and to a computer mouse 207. In addition, the first computer 200 is connected to further computers 210, 220, 230, 240 and 250 via a communication network 260, in the example, an ISDN network (Integrated Services Digital Network).

The first computer 200 stores a database 208. The further computers 210, 220, 230, 240 and 250 each likewise have a processor 213, 223, 233, 243 and 253 and each have a memory 212, 222, 232, 242 and 252. The processor 213, 223, 233, 243 and 253 and the memory 212, 222, 232, 242 and 252 are each connected via a respective bus 214, 224, 234, 244 and 254 to the communication network 260 via an input/output interface 211, 221, 231, 241 and 251. In addition, the further computers 210, 220, 230, 240 and 250 are each connected to a screen 215, 225, 235, 245 and 255 and to a keyboard 216, 226, 236, 246 and 256 and to a computer mouse 217, 227, 237, 247 and 257.

A respective copy of the database 208, called a copy database 218, 228, 238, 248 and 258 below, is transmitted from the first computer 200 to a respective further computer 210, 220, 230, 240 and 250 and is stored there in the respective memories 212, 222, 232, 242 and 252. Once the copy databases 218, 228, 238, 248 and 258 have been transmitted, the computers 200, 210, 220, 230, 240 and 250 interrupt communication and an independent change is made among the respective computers 200, 210, 220, 230, 240 and 250, i.e., the removal or addition of data, or the removal or addition of dependencies of the data in a copy database 218, 228, 238, 248 and 258 and in the database 208.

Once communication between the first computer 200 and the further computers 210, 220, 230, 240 and 250 is resumed, a consistent database must be formed from the database 208 and the copy databases 218, 228, 238, 248 and 258. For this purpose, it is necessary to establish respective changes made in the database 208 or in the copy databases in order to ascertain inconsistencies between the copy databases and the database 208 so that the inconsistencies can be eliminated. Independently of the syntactical structure and of the dependencies of the data elements on one another, each data element can have an arbitrary number of properties. In this context, each property is of a particular property type and is represented by a current value. For all properties, it is assumed with regard to the value ranges that all values may comprise only symbols or compiled symbols from an ASCII table (digits, numbers, letters, special characters, character chains). A series of such characters and symbols is called an entry below. More complex properties are represented in the application modeling by data elements and relationships.

Three types of properties for the syntactical analysis are distinguished below on the basis of the operations which can be carried out on the property:

Individual Value:

A "value" as a property type describes an individual entry, the entry always being regarded in its entirety and also being modified as such. In this context, the "value" type property is always modified by complete replacement of the entry for the property with a new entry.

Listing:

A "listing" as a property type describes a quantity of arbitrary entries, the entries bearing no relation to one another and, for their part, being able to represent an individual value, a listing, or an ordered listing. In this context, the individual entries can be added or deleted only individually. The unambiguity of the entries must be ensured if requested by the application. An example of a data structure representing this property type is a hash table or an array.

Ordered Listing:

Properties of the "ordered listing" type describe a quantity of arbitrary entries, like properties of the simple listing type. In this case, however, the entries are in a defined order with respect to one another, this order being stipulated by way of an index for each entry. The indices are stipulated relative to the start of the listing. An insertion operation with individual entries or with a plurality of entries therefore always relates to an index. A deletion operation can relate to an individual entry with only one index or to a series of successive entries, and hence to a start index and an end index. The criterion for the order is defined by an application program, and the observance of the order criteria is also monitored by the latter. An example of this property type is an indexed list containing arbitrary entries (e.g. text document), in which each line or each character corresponds to one entry.

A data element DE means a 4-tuple defined as follows:

Data Element

A data element DE is a 4-tuple

DE def (ID, infospace, elementtype, properties);

ID is a one-to-one identifier throughout the system infospace∈MIR; where MIR is a quantity of all the information spaces elementtype∈ET; where ET is a quantity of all the data element types properties∈{(name, propertytype, value):

name∈MEN, value∈MEW, propertytype∈MET}, where:

MEN is a quantity of all the property names and the following applies:

$\forall\ i \in \{1, \ldots, n\};\ \forall\ k \in \{1, \ldots, m\}: name_i \ne name_k$, MEW is a quantity of all the property values, and MET is a quantity of all the property types {"value", "listing", "ordered listing"}.

In addition, an information space is defined as follows:

Information Space

An information space IR is a 3-tuple

IR def (ID, irname, owner, data)
  ID is a one-to-one identifier throughout the system, where the following applies:
  $\forall i \in (1, \ldots, n); \forall k \in (1, \ldots, n): i \neq k$:
  IRi.ID ≠ IRk.ID;
  where MIR is a quantity of all the IRs present in the system and n is their number;
  irname∈MIRN
  where the following applies:
  $\forall i \in (1, \ldots, m); \forall k \in (1, \ldots, m): i \neq k$:
  Iri.irname # Irk.irname;
  where MIR is the quantity of all the IRs present in the system and m is their number;
  MIRN represents a quantity of all the possible information space names;
  owner=Ni where Ni∈MN or Ngi where Ngi∈MNG;
  data is the data which can be accessed by a user group and is associated with the IR.

A relationship between the data elements is additionally defined as follows:

Relationship Between Data Elements
  A relationship BZ between data elements is a 3-tuple
  BZ def (relationshiptype, name, dataelement1, dataelement2)
    name∈MBN; where MBN is a quantity of all the relationship names
    relationshiptype∈MBT; where MBT is a quantity of all the relationship types {"undirected", "logical", "successor", "subsup"}
    dataelement1, 2 E MDE; where MDE is a quantity of all the data elements.

In order to ascertain inconsistencies, each computer 200, 210, 220, 230, 240 and 250 carries a respective protocol relating to all the operations carried out on the database or on the respective copy database and stores it in the form of a list. The stored list is called the history below. Hence, the database 208 and each copy database 218, 228, 238, 248 and 258 have a respective associated history.

Figure 3:
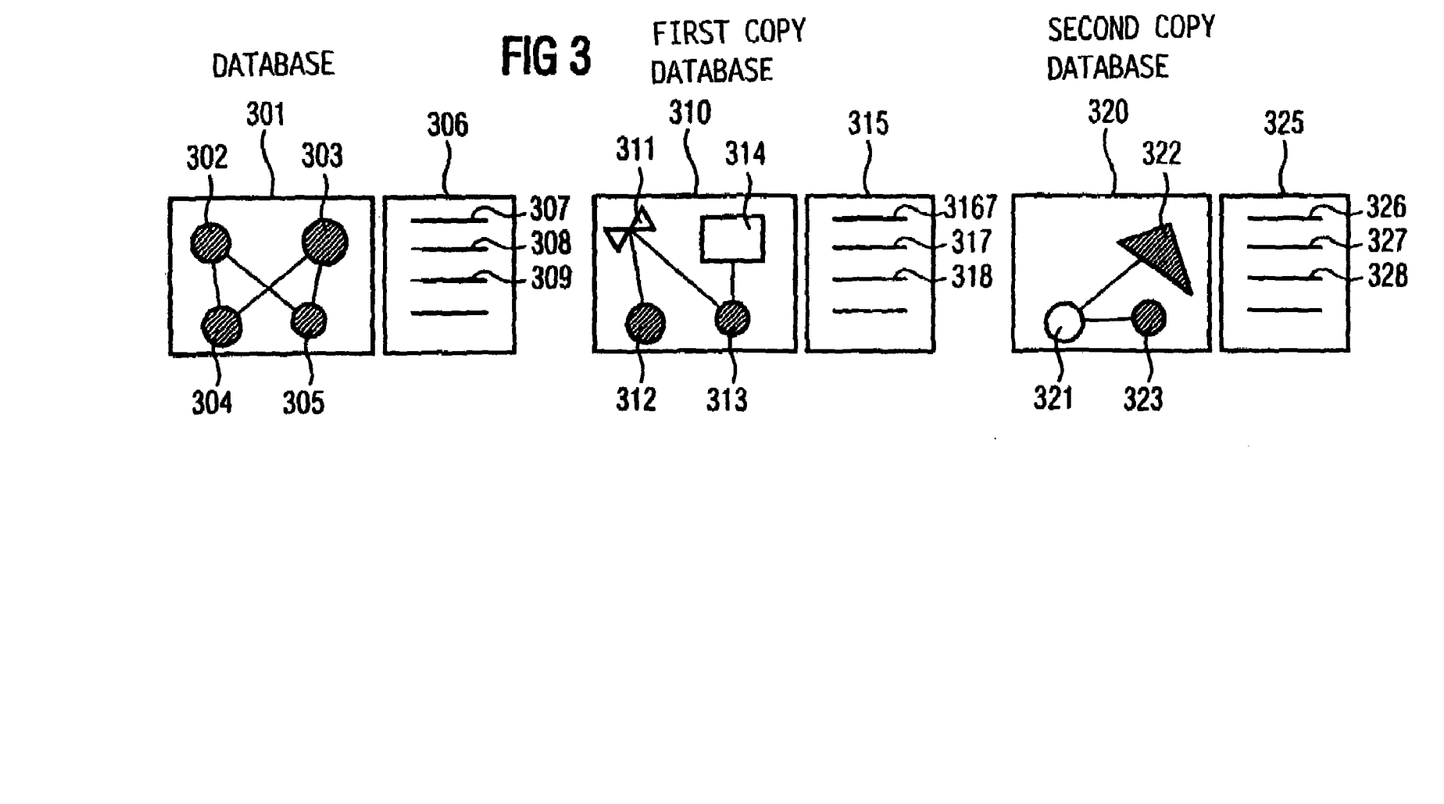
FIG. 3 is a pictorial diagram of a database structure.

This situation is shown in FIG. 3, which shows the database 301 containing objects 302, 303, 304 and 305 and also a history 306 storing, as entries 307, 308, 309, change operations which have been carried out on the database 301 by the first computer 200 since communication with the further computers 210, 220, 230, 240 and 250 was interrupted. The entries 307, 308, 309 are likewise stored in the memory 202 of the first computer 200.

A first copy database 310 containing objects 311, 312, 313 and 314 likewise has an associated history 315 with appropriate change operations 316, 317, 318. The copy database 310 is stored in the further computer 210. A second copy database 320 containing objects 321, 322, 323 and its associated history 325 with change operations 326, 327, 328 is stored in a further computer 220. To form a consistent database, i.e., to reintegrate all the copy databases 218, 228, 238, 248 and 258 with the database 208, the histories 315, 325, etc. are transmitted to the first computer 200 via the communication network 260 and are stored in the memory 202 of the first computer 200. At the start of reintegration, which is described in FIG. 1 by step 101, all the histories of the copy databases are transmitted to the first computer and are stored there (step 102). In a third step (step 103), all the histories 315, 325, etc. to be taken into account for reintegration are determined.

In addition, the following change operations are taken into account and are used to uniquely describe the inconsistencies which have arisen. Within the context of this illustrative embodiment, the following nine operations are taken into account as change operations, which are described below in the form of a pseudo-program code:

```
1. Create Element:
   Create Element (R(IR), ID, Element type) → R(IR)
   createElement(ir, id, elementtype) RETURN R(IR)
      BEGIN element := instantiate(elementtype)
         element.elementname:= id
         R(ir):= insert(R(ir).data,element)
         R(ir):= add(R(ir).history,
         "createElement(id,elementtype)")
         return R(ir)
      END
```

This operation creates a data element of the data type elementtype with the identifier id in a copy database R(ir) within an information space Ir, to which this operation is applied. In this context, all of the properties of the newly created data element receive a preset initialization value. Having been initialized, the new element is added under the specified name to the data in the copy database R(ir) and the executed operation is added without the information space as a parameter into the history R(ir).history associated with the copy database. In this context, the unique identifier id can be created by the application sending the operation.

```
2. DeleteElement:
   DeleteElement(R(IR),ID) → R(IR)
   deleteElement(ir,id)RETURN R(IR)
      BEGIN element:= select (R(ir).data,id)
         R(ir):= remove(R(ir).data, element)
         R(ir):= add(R(ir).history,"deleteElement(id)")
         return R(ir)
      END
```

This operation deletes a data element with the name id from the copy database R(ir) of the information space ir and writes the executed operation into the history R(ir).history associated with the copy database. All the properties of the data element which have been modified since the instantiation of the data element are also lost in the process. The relationships affecting the element are retained, however. If these are likewise to be deleted, then the application program is responsible for this.

```
3. ChangeProperty:
   ChangeProperty(R(IR), ID, Property type, Value) → R(IR)
   changeProperty(ir, id, propname, newValue) RETURN R(IR)
      BEGIN element := select (R(ir).data,id)
         property := select(element.properties,
         propname)
         property.value := newValue
         R(ir):= add (R(ir).history, "changeProperty
         (id, propname, newValue)")
         return R(ir)
      END
```

This operation sets the value of the property propname of the data element with the identifier id to the value newValue in the copy database R(ir) of the information space ir and writes the executed operation into the history R(ir).history associated with the copy database.

```
4. ChangePropertyAdd:
    ChangePropertyAdd(R(IR),ID,Property type,Entry)→R(IR)
    changePropertyAdd(ir,id,propname,newEntry) RETURN R(IR)
        BEGIN element := select (R(ir).data, id)
            property := select (element.properties,
            propname)
            add (property.value, newEntry)
            R(ir) := add(R(ir).history,
            "changePropertyAdd (id, propname,
            newEntry)")
            return R(ir)
        END
```

This operation is for properties of the "listing" type. The operation adds a new entry newEntry to the copy database R(ir) of the information space ir in the value of the property propname of the data element with the identifier id at the end of the listing. The executed operation is then stored in the history R(ir).history associated with the copy database.

```
5. ChangePropertyDel:
    ChangePropertyDel(R(IR), ID, Property type, Index,
                Entry) → R(IR)
    changePropertyDel(ir, id, propname, index, oldEntry)
                RETURN R(IR)
        BEGIN element := select (R(ir).data, id)
            property := select (element.properties,
            propname)
            del (property.value, oldEntry)
            R(ir) := add(R(ir).history,
            "changePropertyDel(id, propname, index,
            oldEntry)")
            return R(ir)
        END
```

This operation is for properties of the "listing" type. The operation deletes the first entry oldEntry occurring in the listing in the copy database R(ir) of the information space ir in the value of the property propname of the data element with the identifier id. The executed operation is then stored in the history R(ir).history associated with the copy database.

```
6. ChangePropertyInsert:
    ChangePropertyInsert(R(IR), ID, Property type, Index,
                Number, Entries) → R(IR)
    changePropertyInsert(ir, id, propname, index, number,
                newEntries) RETURN R(IR)
        BEGIN element := select (R(ir).data, id)
            property := select (element.properties,
            propname)
            for (I=0, 1 < number, i++){
            incrIndex (property.value.entries,ind >=
            index)
            insert (property.value.index, newEntries.
            (number −i))}
            R(ir) := add (R(ir).history,
            "changePropertyInsert (id, propname, index,
            number, newEntries)")
            return R(ir)
        END
```

A property to which this operation can be applied is of the "ordered listing" type. This operation inserts a number number of new entries newEntries.i in the copy database R(ir) of the information space ir in the value of the property propname of the data element with the identifier id from the position Index in the ordered listing Property.Value. For all the entries in the ordered listing property.Value having an identical index to or a larger index than index, index is increased by the value number. The executed operation is then stored in the history R(ir).history associated with the respective copy database.

```
7. ChangePropertyRemove:
    ChangePropertyRemove(R(IR), ID, Property type, Index,
                Number, Entries) → R(IR)
    changePropertyRemove(ir, id, propname, index, number,
                oldEntries) RETURN R(IR)
        BEGIN element := select (R(ir).data,id)
            property := select (element.properties,
            propname)
            for (i=0, i < number, i++){
            remove (property.value.index, oldEntries.
            (i+1))
            decrIndex (property.value.entries, ind >
            index)}
            R(ir) := add(R(ir).history,
            "changePropertyRemove(id, propname, index,
            number, oldEntries)")
            return R(ir)
        END
```

A property to which this operation can be applied is of the "ordered listing" type. This operation deletes the entries oldEntries in the copy database R(ir) of the information space ir in the value of the property propname of the data element with the identifier id from the position Index in the ordered listing Property.Value. All entries with a larger index than (index+number) have their index reduced by the value number. The executed operation is then stored in the history R(ir).history associated with the respective copy database.

```
8. CreateRelationship:
    CreateRelationship(R(IR), Name, Relationship type,
                ID1, ID2)→R(IR)
    createRelationship(ir, name, reltype, fromid, toid,
                toidir) RETURN R(IR)
        BEGIN relationship := instantiate (reltype)
            relationship.name := name
            relationship.dataelement1 := fromid
            relationship.dataelement2 := toid
            relationship.dataelement2.ir := toidir
            R(ir) := insert (R(ir).data, relationship)
            R(ir) := add (R(ir).history,
            "createRelationship (name, reltype, fromid,
            toid, toidir)")
            return R(ir)
        END
```

This operation creates a relationship of the reltype type between the data elements with the identifiers fromid and toid under the name name and adds the new relationship to the data in the copy database R(ir) of the information space ir. The executed operation is then stored in the history R(ir).history associated with the copy database. It is assumed for all relationships that, for each relationship name allocated, there is only a single relationship of the same type between two data elements. If a plurality of relationships of the same type are necessary under the same name between two data elements, then identifiers need to be introduced for relationships as well. However, the assumption made is sufficient for the majority of applications. The information space of the target data element need be specified only in the case of a logically externally directed relationship.

```
9. DeleteRelationship:
   DeleteRelationship(R(IR), Name, Relationship type, ID1,
           ID2)→R(IR)
   deleteRelationship(ir, name, reltype, fromid, toid.toidir)
           RETURN R(IR)
   BEGIN relationship := select (R(ir).data, name,
               reltype, fromid, toid)
           R(ir) := remove (R(ir).data, relationship)
           R(ir) := add (R(ir).history,
           "deleteRelationship (name, reltype, fromid,
           toid.toidir)")
               return R(ir)
   END
```

This operation deletes a relationship of the reltype type between the data elements with the identifiers fromid and toid under the name name from the copy database R(ir) of the information space ir. The executed operation is then stored in the history R(ir).history associated with the copy database. The information space of the target data element need be specified only for the relationships of the logically externally directed type.

In a further step, all conflicts, dependencies, anomalies, pseudo-anomalies and restrictions by dependencies are recognized (step 103). A conflict means the smallest decidable quantity of operations which arise only on one side in syntactical terms, uniquely describe an inconsistency and can be meaningfully presented to a user or to the system and eliminated (decided) by the latter. Each conflict can be recognized as a whole and can be resolved by a single decision during reintegration. Potential conflicts are subsequently defined on the basis of the data structure and the operations occurring in the history.

A distinction is drawn between harmless conflicts and critical conflicts. Harmless conflicts (HK) contain only operations which describe modifications on one copy database. In this case, there is therefore just one user desiring and making a change to the part of the data structure or the copy database or else the database itself. The operations carried out are thus complemented. Depending on which copy database is to be allocated the operation or operations, when the copy databases of users A and B are present, harmless conflicts with operations on the copy database of a first user A can be referred to as HKA and harmless conflicts with operations on the copy database of a second user B can be referred to as HKB, on a general basis.

By contrast, critical conflicts (KK) contain changes on both sides to the same part of the data structure and represent contrary views of the users about the ultimate state of particular data within the database and copy databases. In this context, a critical conflict can also be defined by different operations on two copy databases. In such cases, a distinction is drawn between a critical conflict KKA and a critical conflict KKB.

Formally, a conflict is defined as follows:

Conflict:
A conflict K between two histories EHA and EHB and a common history GH is a 6-tuple
K(EHA, EHB, GH) def
  (id, ktype, operationsEHA, operationsEHB, operationsGH, decisionrestr);
  id is a one-to-one identifier throughout the system (see also the definition of a data element)
  ktype∈{HK1A, . . . , HK11A, HK1B, . . . , HK11B, KK1, KK2, KK3A, KK3B, KK4, KK5A, KK5B, KK6, KK7, KK8A, KK8B}
  operationsEHA∈EHA.operations;
  operationsEHB∈EHB.operations;
  operationsGH∈GH.operations;
  decisionrestr ∈ MENTktype; where MENTktype is a quantity of all the possible decisions for a conflict of the type ktype.

Figure 4:
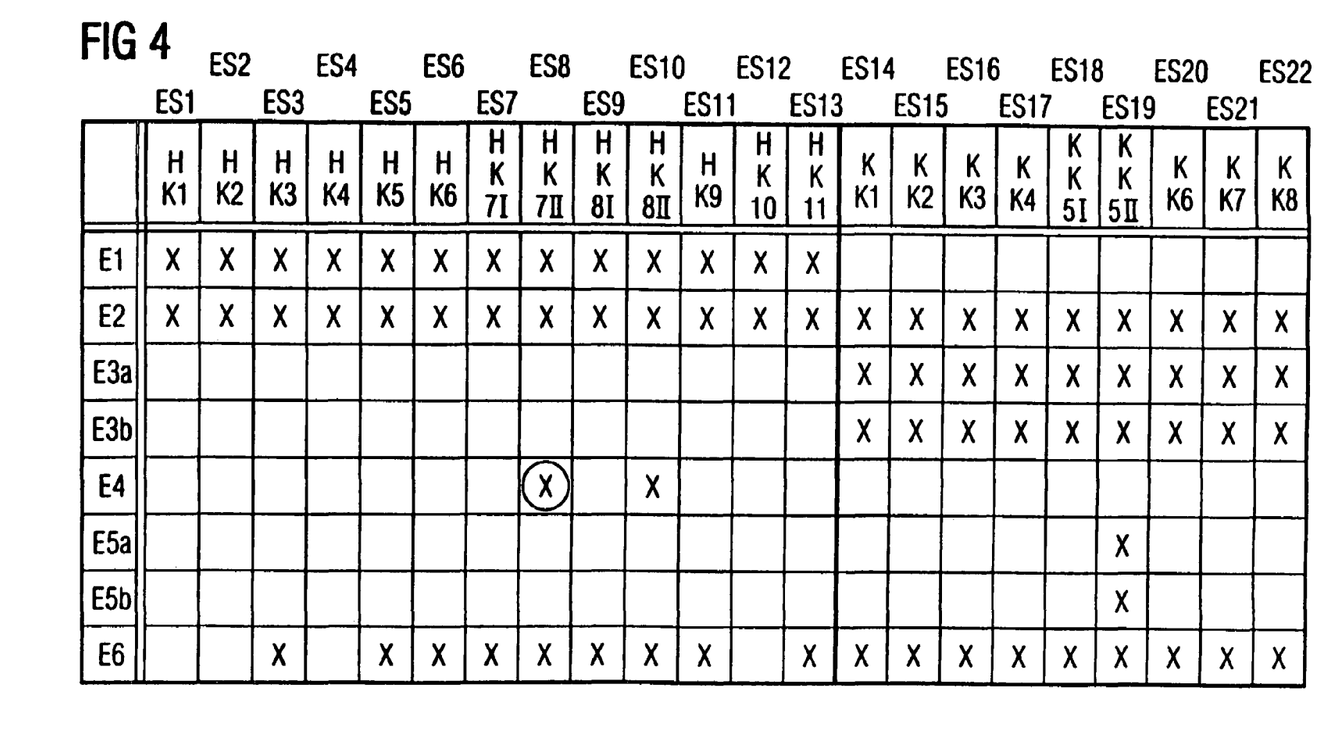
FIG. 4 is a table presenting an overview of possible conflicts and decision sets with decision options for eliminating the respective conflicts.

The conflicts are shown in FIG. 4.

1. First Harmless Conflict HK1:
HK1=(createElement/—)
There is a creation operation for a data element createElement(id, elementtype) in one history only.
HK1A=createElement(id, elementtype)∈EHA∨
HK1B=createElement(id, elementtype)∈EHB.

2. Second Harmless Conflict HK2:
HK2=(deleteElement/—)
There is a deletion operation for a data element deleteelement(id, elementtype) in one history only.
HK2A=deleteElement(id, elementtype)∈ EHA∨
HK2B=deleteElement(id, elementtype)∈EHB.

3. Third Harmless Conflict HK3:
HK3=(createRelationship/—)
There is a creation operation for a relationship createRelationship (reltype, rname, id1, id2) in one history only.
HK3A=createRelationship(reltype, rname, id1, id2)∈EHA∨
HK3B=createRelationship(reltype, rname, id1, id2)∈EHB.

4. Fourth Harmless Conflict HK4:
HK4=(deleteRelationship/—)
There is a deletion operation for a relationship deleteRelationship (reltype, rname, id1, id2) in one history only.
HK4A=deleteRelationship(reltype,rname,id1,id2)∈EHA∨
HK4B=deleteRelationship(reltype,rname,id1,id2)∈EHB.

5. Fifth Harmless Conflict HK5:
HK5=(deleteRelationship12, createRelationship 13/—)
There is a deletion operation for a relationship deleteRelationship(reltype, rname id1, id2) and a subsequent creation operation for the relationship creationRelationship (reltype, rname, id1, id3) from the same source data element to another target data element in one history only.
HK5A=[deleteRelationship(reltype,rname,id1,id2), createRelationship(reltype,rname,id1,id3)]∈EHA∨
HK5B=[deleteRelationship(reltype,rname,id1,id2), createRelationship(reltype,rname,id 1,id3)]∈EHB.

6. Sixth Harmless Conflict HK6:
HK6=(changeProperty/—)
There is a change operation changeproperty(id, name, valuenew, valueold) for a property of the "Value" type in one history only.
HK6A=changeProperty(id,name,value1,value0)∈EHA∨
HK6B=changeProperty(id,name,value1,value0)∈EHB.

7. Seventh Harmless Conflict HK7:
HK7=(n×changePropertyAdd/—)
There are n (n is an element of the natural numbers and n>0) insertion operations changePropertyAdd(id, name, entry) with the same entry entry for the same property of the "listing" type for a data element in one history, with there being no deletion operation with the same entry for the same property of the data element in another history. The inconsistency described consists in the fact that there are n entries of the type entry more in the copy database with the creation operations in the history associated with the copy database than in the other copy database.
HK7A=n times changePropertyAdd(id,name,entry)∈EHA∨
HK7B=n times changePropertyAdd(id,name,entry)∈EHB.

8. Eighth harmless conflict HK8:
HK8=(n×changePropertyDel/—)

There are n (n is an element of the natural numbers) deletion operations changePropertyDel(id, name, entry) with the same entry entry for a property of the "listing" type for a data element in one history, with there being no insertion operation with the same entry for the property of the data element in another history. The inconsistency described consists of the fact that the n entries of the type entry are present to a lesser extent in the copy database whose history contains the deletion operations than in the other copy database.

HK8A=n times changePropertyDel(id,name,entry)∈EHA∨
HK8B=n times changePropertyDel(id,name,entry)∈EHB.

9. Ninth Harmless Conflict HK9:
HK9=(changePropertyInsert/—)

There is an insertion operation changepropertyinsert(id, name, index1, 1, entry1) for an index with an individual entry for a property of the "ordered listing" type for a data element in one history only, with another history containing no insertion operations with another entry for a checkable identical index for the same property of the data element.

HK9A=changePropertyinsert(id,name,index,1,entry) ∈EHA∨
HK9B=changePropertyinsert(id,name,index,1,entry)∈EHB.

10. Tenth Harmless Conflict HK10:
HK10=(changePropertyRemove/—)

There is a deletion operation changePropertyRemove(id, name, index1, 1, entry1) for an index with an individual entry for a property of the "ordered listing" type for a data element in one history only.

HK10A=changePropertylRemove(id,name,index,1,entry) ∈EHA∨HK10B=changePropertylRemove(id,name,index, 1,entry)∈EHB.

11. Eleventh Harmless Conflict HK 1:
HK11=(changePropertyRemove,changePropertyinsert/—)

There is a deletion operation changePropertyRemove(id, name, index1, 1, entry1) for an index index with an individual entry for a property of the "ordered listing" type for a data element, and a subsequent creation operation changepropertyinsert (id, name, index1, 1, entry2) for an entry for the same index for the same property of the same data element in one history only.

HK11A=[changePropertylRemove(id,name,index, 1,entry1), changePropertylInsert(id,name,index, 1,entry2)]∈EHA∨
HK11B=[changePropertylRemove(id,name,index, 1,entry1), changePropertylInsert(id,name,index, 1,entry2)] ∈EHB.

The following text gives an overview of critical conflicts (KK), i.e. operations in a plurality of histories:

1. First Critical Conflict KK1:
KK1=(createRelationship12/createRelationship13)

There is a creation for a relationship createRelationship (reltype, rname, id1, id2) in one history, with a creation createRelationship(reltype, rname, id1, id3) for the same relationship (reltype, rname), starting from the same source data element but to another target data element, existing in another history.

KK1=createRelationship(reltype,rname,id1,id2)∈EHA∧ createRelationship(reltype,mame,id1,id3)∈EHB.

2. Second critical conflict KK2:
KK2=(deleteRelationship12, createRelationship13/deleteRelationship12, createRelationship14)

The different change in a relationship can be recognized in the histories like the first critical conflict KK1. In addition, however, a common history GH contains a deletion deleteRelationship(reltype, mame, id1, id2) for the common relationship (rname, reltype) from the same source data element, but to another target data element.

KK2=deleteRelationship(reltype,rname,id1,id2)∈GH∧createRelationship(reltype,rname,id1,id3)∈EHA∧createRelationship(reltype,rname,id1,id4)∈EHB.

3. Third Critical Conflict KK3:
KK3=(deleteRelationship12, createRelationship131 deleteRelationship12)

A relationship's modification on one side and deletion on the other side can be recognized in the histories, like the third harmless conflict HK3, by an operation createRelationship(reltype, rname, id1, id3). In addition, however, the common history contains a deletion deleteRelationship (reltype, rname, id1, id2) for the common relationship (rname, reltype) from the same source data element but to the last common target data element.

KK3A=deleteRelationship(reltype,rname,id1,id2) ∈GH∧createRelationship(reltype,rname,id1,id3)∈EHA;
KK3B=deleteRelationship(reltype,rname,id1,id2)∈GH∧createRelationship(reltype,rname,id1,id3)∈EHB.

4. Fourth Critical Conflict KK4:
KK4=(changeProperty/changeproperty)

There is a change operation changeproperty (id, name, valuenew1, valueold) for a property of the "value" type for a data element in one history, with another change operation existing in another history for the same property of the data element.

KK4=changeProperty(id,name,valuenew1, valueold) ∈EHA∧
changeProperty(id,name,valuenew2, valueold)∈EHB.

5. Fifth Critical Conflict KK5:
KK5=(n changePropertyAdd/m changePropertyDel)

There are n (n is an element of the natural numbers) identical operations of the type changePropertyAdd(id, name, entry) with the same entry for a property of the "listing" type for a data element in one history, with another history m (m is an element of the natural numbers) containing identical operations of the type changePropertyDel(id, name, entry) with the same entry for the same property of the data element. The inconsistency described consists of the fact that the copy database with the creation operations in the history associated with the copy database contains n+m identical entries entry more than the other copy database. To be able to make an exact statement about the occurrence of the operations, a distinction is drawn for the fifth critical conflict KK5 between a fifth critical conflict of first type KK5A and a fifth critical conflict of second type KK5B. In this case, the allocation is made using the creation operations.

KK5A=(n changePropertyAdd(id,name,entry) ∈EHA∧changePropertyDel(id,name,entry)∈EHB∨
KK5B=(m changePropertyDel(id,name,entry)∈EHA; n changePropertyAdd(id,name,entry)∈EHB.

6. Sixth Critical Conflict KK6:
KK6=(changePropertyinsert/changepropertyInsert)

There is an insertion operation changePropertyInsert(id, name, index1, 1, entry1) for an index with an individual entry for a property of the "ordered listing" type for a data element in one history, with another history containing an insertion operation with another entry for the same (this can be checked) index for the property of the data element.

KK6=changePropertyinsert(id,name,index1,1,entry1)
  ∈EHA∧changepropertyInsert(id,name,index2,1,entry2)
  ∈EHB.

7. Seventh Critical Conflict KK7:

KK7=(changePropRemove, changepropInsert/changePropRemove, changepropInsert)

The different change on the two sides in an individual entry on a common index index for a property of the "ordered listing" type for a data element can be recognized in the histories like the sixth critical conflict KK6. In addition, however, the common history contains a changePropertyRemove(id, name, index1, 1, entry1) operation for the last common entry on the same (this can be checked) index.

KK7=changePropertyRemove(id,name,index1,1,entry1)
  ∈GH∧
  changePropertyInsert(id,name,index2,1,entry2)∈EHA∧
  changePropertyinsert(id,name,index3,1,entry3)∈EHB.

8. Eighth critical conflict KK8:

KK8=(changePropRemove, changePropInsert/changePropRemove)

The change, on one side, and deletion, on the other side, in/of an individual entry on a common index index for a property of the "ordered listing" type for a data element in the histories can be recognized like a tenth harmless conflict HK10. In addition, however, the common history contains a changePropertyRemove(id, name, index1, 1, entry1) operation for the last common entry on the same (this can be checked) index.

KK8A=changePropertyRemove(id,name,index1,1,entry1)
  ∈GH∧
  changePropertyinsert(id,name,index2, 1,entry2)∈EHA;
KK8B=changePropertyRemove(id,name,index1,1,entry1)
  ∈GH∧
  changePropertyinsert(id,name,index2,1,entry2)∈EHB.

The operations stored in the histories describe the autonomously modified data areas directly and are used to describe and to eliminate (described below) the inconsistencies. To recognize the inconsistencies, two respective histories are compared with one another. The inconsistencies are recognized at the start of the method, before the actual reintegration.

The search for the existing inconsistencies in the copy databases by searching for conflict operations is carried out in the three steps described below.

A first step makes a pass through the two histories to be compared with one another in the copy databases and in the database, which are to be matched to one another. All of the operations in the histories are allocated, separately on each side, to a respective one of the new operation collections (createElement operations, deleteElement operations, createRelationship operations, deleteRelationship operations, changeProperty operations, changePropertyAdd operations, changePropertyDel operations, changepropertyInsert operations and changePropertyRemove operations) described above.

In a second step, a respective conflict register KR is started for each conflict type described above HK1A through HK11A, HK1B through HK11B, KK1, KK2, KK3A, KK3B, KK4, KK5A, KK5B, KK6, KK7, KK8A, KK8B. In this context, it is ensured that all conflicts for which operations from the two histories contribute to the respective conflict are not recognized twice and stored in the respective conflict register KR twice. Accordingly, the operation collections just formed are searched through on the basis of the definitions of the conflict types, as described above, starting with the first harmless conflict HK1A in the history of the first user A. If a conflict has been ascertained, the conflict is stored in the conflict register KR for the appropriate conflict type, for example, the first harmless conflict HK1 is stored in the copy database of the first user A in a conflict register KR_HK1A.

If the search and storage of the conflicts has taken place, the operation collections created at the start are deleted again in a third step. The subsequent elimination of the inconsistencies is based on the conflicts stored in the conflict registers KA and on the operations of these conflicts.

A conflict register KR is defined as follows:

Conflict register KR:
  A conflict register KR for two histories EHA and EHB and a common history GH is a 2-tuple
  KR(EHA, EHB, GH) def (crtype, conflictids)
    crtype ∈ {KA_KHK1A, . . . , KA_HK11A, KA_HK1B, . . . , KA_HK11B, KA_KK1, KA_KK2, KA_KK3A, KA_KK3B, KA_KK4, KA_KK5A, KA_KK5B, KA_KK6, KA_KK7, KA_KK8A, KA_KK8B}
    conflictids are identifiers for all the conflicts K(EHA, EHB, GH) associated with the conflict register KR, where K.type can be allocated to the respective conflict array type KR.crtype.

An anomaly is present when two data elements exist in the two copy databases before and after the division and the latter are connected after the division by a directed relationship of the same type reltype and with the same name rname, but with source data element and target data element reversed. During the reintegration, at least one of these relationships must be rejected or the two must be modified. A directed relationship means a relationship which is directed from a target data element to a source data element.

An anomaly is defined as follows:

Anomaly:
  An anomaly AM between two conflicts K1 (EHA, EHB, GH) and K1 (EHA, EHB, GH) is a 4-tuple
  AM(K1, K2) def (id, amtype, cid1, cid2)
    id is a one-to-one identifier throughout the system (see also definition of a data element)
    amtype∈{Anomaly1a, . . . , Anomaly16AB}
    cid1=K.id
    cid2=K2.id.

An anomaly register AMR for two histories is defined as follows:

Anomaly register AMR:
  An anomaly register AMR for two histories EHA and EHB and a common history GH is a 1-tuple
  AMR (EHA, EHB, GH) def (anomalyids)
    anomalyids are the identifiers for all anomalies between the histories EHA and EHB and the common history GH.

Pseudo-anomalies describe situations in which the occurrence of an anomaly from conflicts which are present can be prevented only through targeted minimization of the decision options for the conflicts.

A pseudo-anomaly is defined as illustrated below:

Pseudo-anomaly PAM:
  A pseudo-anomaly PAM between two conflicts K1 (EHA, EHB, GH) and K2(EHA, EHB, GH) is a 4-tuple PAM(K1, K2) def (id, pamtype, cid1, cid2)
    id is a one-to-one identifier throughout the system (see also definition of a data element)
    pamtype∈{pseudo-Anomaly1A, . . . , pseudo-Anomaly32AB}
    cid1=K1.id
    cid2=K2.id.

A pseudo-anomaly register PAMR is defined as follows:

Pseudo-anomaly Register PAMR:
    A pseudo-anomaly register PAMR for two histories EHA and EHB and a common history GH is a 1-tuple PAMR (EHA, EHB, GH) def (pseudo-anomalyids)
    Pseudo-anomalyids are the identifiers for all pseudo-anomalies between the histories EHA and EHB and the common history GH.

After the conflicts have been ascertained, each ascertained conflict is resolved via a respective individual decision. The conflict resolution process thus comprises a sequence of conflict resolution decisions. The conflict resolution is denoted in FIG. 1 by step 104.

In principle, there are various decision options:
a) Adopt the conflict operation(s);
b) Reject the conflict operation(s);
c) Partly adopt, partly reject the conflict operation(s); and
d) Reject the conflict operation(s), adopt new created operation(s).

The individual conflict types are allocated a decision set ES that contains possible decisions which can be used to eliminate an inconsistency created by an operation of the respective conflict type, to which a respective decision set ES is allocated.

FIG. 4 provides a compilation of all of the decision sets which are allocated to a respective conflict. Each row of the table shown in FIG. 4 shows a possible decision option E1, E2, E3a, E3b, E4, E5a, E5b, and E6. In each case, an x in a field denotes that the conflict shown in the respective column can be resolved by a decision option which is shown in the respective row.

The following text gives an overview of the possible decision options: A first decision option E1 describes the adoption of a conflict operation or of a plurality of conflict operations. A conflict operation describes all of the data operations associated with a conflict. "Adopt" means that the conflict operations are executed in the copy database in which they have not yet been carried out.

A second decision option E2 describes the rejection of a conflict operation or a plurality of conflict operations.

A third decision option E3 describes the adoption of one or more conflict operation(s) in one copy database and the rejection of the conflict operation(s) in the other copy database. For the third decision option E3, a detail decision is provided which defines which of the conflict operations present in the histories of different copy databases of the users A and B are to be adopted and which are to be rejected. These decision options are denoted as a first part E3a of the third decision option E3 and as a second part E3b of the third decision option E3. The first part E3a of the third decision option E3 describes the adoption of the conflict operation(s) in the copy database of the first user A and the rejection of the conflict operation(s) in the copy database of the second user B. The second part E3b of the third decision option E3 describes the adoption of the conflict operation(s) of the copy database of the second user B and the rejection of the conflict operation(s) of the copy database of the first user A.

As FIG. 4 shows, a first decision set ES1, which is allocated to the first harmless conflict HK1, describes the first decision option E1 and the second decision option E2 to eliminate the first harmless conflict HK1. A second decision set ES2 is allocated to the second harmless conflict HK2 and again contains the first decision option E1 and the second decision option E2 to eliminate the second harmless conflict HK2.

If the previous resolution options through the adoption or rejection of available conflict operations do not correspond to the target ideas of the users with regard to the ultimate reintegrated database, i.e., the users A and B cannot agree on one state described by the conflicts, then there is the option of adopting an intermediate solution or the option of selecting and adopting new operations not contained in the decision set. The two options will be illustrated below.

For a conflict with a number n of identical operations, defining the conflict, from a set of data operations in only one history (conflicts of the type HK7 II and HK8 II), there are generally selection options for intermediate states, as described below.

For the seventh harmless conflict HK7 with n=1, HK7 I is written below, and HK7 II is written below for the seventh harmless conflict HK7 with n>1. For the eighth harmless conflict HK1 with n=1, HK8 I is written below, and HK8 II is written below for the eighth harmless conflict HK8 with n>1.

In this context, a fourth decision option E4 describes a partial adoption and partial rejection of the conflict operations. For the fourth decision option E4, a more precise statement is provided which defines how many of the conflict operations arising on one side are to be adopted and how many are to be rejected. For a number of n operations (n is the element of the natural numbers), the decision options extend from adoption of one operation and rejection of n−1 operations up to adoption of n−1 operations and rejection of one operation. In this case, an adequate decision option is to define the number k (0<k<n) of adopted operations. The number of rejected operations is then calculated from n−k. The fourth decision option E4 can thus be specialized as follows: the fourth decision option E4 describes the number of adopted conflict operations k.

In addition, the fifth critical conflict KK5 with n=m=1 is denoted by KK5 I below and the fifth critical conflict KK5 with n>1 and m>1 is denoted by KK5 II below.

For a fifth critical conflict KK5 II with a number n of identical operations changePropertyAdd, defining the conflict, in one copy database and a number m of identical operations changePropertyDel, defining the conflict, in another copy database, selection of the intermediate states is more difficult.

Since the operations defining the conflict in one history and the operations involved in the conflict in the other history cancel one another out, the same end result can be obtained via different decision options.

Thus, resetting a changePropertyAdd operation and adopting a changePropertyAdd operation in one copy database in conjunction with resetting a changePropertyDel operation in another copy database can obtain the same result as adopting two changePropertyAdd operations in one copy database and a changePropertyDel operation in the other copy database. So that all decision options between the extremes of rejecting the operations in one copy database and adopting the operations in the other copy database (third decision option E3a/E3b) are provided, but various decision options are at the same time prevented from supplying an identical result, there is the solution option of the fifth decision option E5, as illustrated below.

The fifth decision option E5 can create the last common state between the copy databases by rejecting all operations and permits all other final states from the combinations of the operations, but without the conflict states present above. The fifth decision option E5 thus describes the partial adoption and partial rejection of the conflict operations in one copy database and the rejection of the conflict operations in another copy database.

For the fifth decision option E5, the decision sub-options are necessary, which firstly define which copy database is affected by the partial adoption and partial rejection and which database is affected by the total rejection, and secondly how many of the conflict operations are to be adopted in the case of partial adoption and how many are to be rejected. In this case, the number of operations during partial adoption and partial rejection can be defined as in the case of the fourth decision option E4 using the sole definition of the number of adopted operations.

The number of adopted operations in a first copy database of the first user A is in this case denoted by i, and the number of adopted operations in the copy database of the second user B is denoted by k. Thus, detail decisions for the fifth decision option E5 are:

First part E5a of the fifth decision option E5:
Number of adopted conflict operations for the copy database of the first user A:
($1<i<n$) if a changePropAdd operation is involved,
($1<k<m$) if a changePropDel operation is involved, and rejection of
all conflict operations for the copy database of the second user B.
Second part E5b of the fifth decision option E5:
Number of adopted conflict operations for the copy database of the second user B:
($1<i<n$) if a changePropAdd operation is involved,
($1<k<m$) if a changePropDel operation is involved, and rejection of all conflict operations for the copy database of the first user A.

A selection option for creating a new state for the conflict will be defined by the decision options below. In general, the option of creating and selecting a state which differs from the two available versions is provided for all conflicts apart from for the conflicts of type HK1, HK2, HK4, HK10.

For creating a new state, it is necessary to create a common starting position, i.e., the relevant operation(s) must be rejected and the two copy databases must be made consistent in terms of the data structure affected by the conflict. This rejection of the operations is not necessary for operations of the changeproperty( ) type (HK6, HK4) which overwrite one another, because the operation created with the new state overwrites the old operations directly.

For a conflict with an operation defining the conflict from the set of data operations (conflicts of the types HK3, HK6, HK7 I, HK8 I and HK9), for a conflict with a plurality of operations defining the conflict from the set of data operations in the case of just one copy database (conflicts of the types HK5, HK7 II, HK8 II, HK11) and for a conflict with at least one operation defining the conflict from the set of data operations in the case of the two copy databases (conflicts of the types KK1 through KK8), there is the following resolution option, which is called the sixth decision option E6.

The sixth decision option E6 describes the rejection of the conflict operation(s) and selection of new operation(s). In this context, to change a relationship (KK2) on both sides or to change an entry in an ordered listing (KK7) on both sides, the rejection, in contrast to the second decision option E2 (rejection of all operations), relates only to the creator operations for the new relationships or for the new entries. The common deletion operation for the old relationship or for the old entry remains unaffected. For the third critical conflict KK3 and the eighth critical conflict KK8, the sixth decision option E6 has the option only of changing the createRelationship or the changePropertyInsert operation. The common deletion operation remains unaffected.

For the definition of a new state for a conflict of type HK7, HK8 or KK5, the number of
changePropertyAdd operations and
changePropertyDel operations is likewise described with i and k
(i if changePropAdd operations are involved and
k if changePropDel operations are involved).

For the selection of a new state and the creation of the operations necessary for this, interactions on the surface of the application program are customary. If the option exists of selecting a new state using only a complex interaction and if the operations created by the interaction also affect other, unresolved conflicts, then there is the option
a) of using the decision set to resolve the other affected conflicts as well, or
b) of shifting creation of the new state to a later instant, i.e., after reintegration and during the coupled further work.

If, in accordance with a), other affected conflicts are likewise to be resolved, then it is first necessary to reject the operations of the conflict set if conflicts of the type HK6 and KK4 are involved and the operations are not operations which overwrite one another.

FIG. 4 shows the decision sets ES1, ES2, ES3, ES4, ES5, ES6, ES7, ES8, ES9, ES10, ES11, ES12, ES13, ES14, ES15, ES16, ES17, ES18, ES19, ES20, ES21, ES22, which are allocated to the respective conflicts.

The sixth harmless conflict HK6 is allocated a sixth decision set ES6, containing the first decision option E1, the second decision option E2 and the sixth decision option E6. A twelfth decision set ES12 is allocated to the first critical conflict KK1. The twelfth decision set ES12 contains four possible decisions, the second decision option E2, the first part E3a of the third decision option E3, the second part E3b of the third decision option E3 and the sixth decision option E6. The further decision sets are shown in FIG. 4 and will be illustrated below for purposes of simplification with the aid of the following list:

The first harmless conflict HK1, the second harmless conflict HK2, the fourth harmless conflict HK4 and the tenth harmless conflict HK10 are allocated respective decision sets comprising the first decision option E1 and the second decision option E2.

The third harmless conflict HK3, the fifth harmless conflict HK5, the sixth harmless conflict HK6, the first type HK7 I of the seventh harmless conflict HK7, the first type HK8 I of the eighth harmless conflict HK8, the ninth harmless conflict HK9 and the eleventh harmless conflict HK11 are allocated respective decision sets containing the first decision option E1, the second decision option E2 and the sixth decision option E6.

The second type HK7 II of the seventh harmless conflict HK7, the second type HK8 II of the eighth harmless conflict HK8, the first critical conflict KK1, the second critical conflict KK2, the third critical conflict KK3, the fourth critical conflict KK4, the first type KK5 I of the fifth critical conflict KK5, the sixth critical conflict KK6, the seventh critical conflict KK7 and the critical conflict KK8 are allocated respective decision sets containing the second decision option E2, the first part E3a of the third decision option E3, the second part E3b of the third decision option E3 and the sixth decision option E6.

The second type KK5 II of the fifth critical conflict KK5 is allocated a decision set having six possible decisions, the second decision option E2, the first part E3a of the third decision option E3, the second part E3b of the third decision option E3, the first part E5a of the fifth decision option E5, the second part E5b of the fifth decision option E5 and the sixth decision option E6.

The second type HK7 II of the seventh harmless conflict HK7 and the second type HK8 II of the eighth harmless conflict HK8 are each allocated a decision set having four possible decisions, the first decision option E1, the second decision option E2, the fourth decision option E4 and the sixth decision option E6.

Restrictions on Decision Options

The correct execution of individual decisions is dependent on the presence of a data element or of a plurality of data elements in the two copy databases.

By way of example, for adoption in the case of the third harmless conflict HK3A, the two data elements denoted by their identifiers in the relationship operation in conflict must also be present in the copy database of the user B. If one of the data elements is missing, or indeed if both are missing, then this decision about adoption of the operation is not possible. It is thus evident that dependencies may exist between individual conflicts.

A dependency of a conflict on conflicts of the type HK1A, HK1B, HK2A or HK2B in terms of its decision options is defined as follows:

Dependent Conflict:

A conflict is dependent on the first harmless conflict HK1 or on the second harmless conflict HK2 if its decision options are restricted by the presence of a first harmless conflict HK1 or of a second harmless conflict HK2. A dependency AK of a conflict is defined as follows:

Dependency AK of a Conflict:

A dependency AK of a conflict K1 (EHA, EHB, GH) on a conflict K1 (EHA, EHB, GH) is a 4-tuple
AK (K1, K2) def (id, ctype, cid1, cid2)
id is a one-to-one identifier throughout the system (see also definition of a data element)
ctype E {HK1A, HK1B, HK2A, HK2B}
cid1=K1.id
cid2=K2.id.

A dependency register AKR is defined as follows:

Dependency Register AKR:

A dependency register AKR for two histories EHA and EHB and a common history GH is a 1-tuple
AKR (EH$_A$, EH$_B$, GH) def (dependencyids)
dependencyids are the identifiers for all recognized dependencies of the histories EH$_A$ and EH$_B$ and the common history GH.

All restrictions on decision options by existing conflicts of the first harmless conflict HK1 and of the second harmless conflict HK2 are recognized and marked at the start of conflict resolution on the basis of the dependencies AK. This is done using the decision restrictions' parameter introduced in the conflict definition for each conflict. All of the possible restrictions are described below.

The first harmless conflict HK1 impairs the decision options for conflicts with operations within the dedicated history. These dependent conflicts include all those containing a createRelationship operation or a property change with the created data element. In this context, in the case of harmless conflicts HK6 through HK11 with property operations for this data element, the decisions are minimized by an adoption and a creation of a new state.

The decision options for the critical conflicts KK1, KK2 and KK3 with relationship operations with the created data element are reduced by the option of adopting the operations (-E3a, -E3b) for the copy database whose history contains the createElement operation. The decision options for the third harmless conflict HK3 and the fifth harmless conflict HK5 with relationship operations with the created data element are reduced by the decision to accept and/or create a new state. Critical conflicts with property operations experience no modifications to their decision collection (decision sets).

A second harmless conflict HK2 impairs the decision option for conflicts in the two copy databases. The harmless conflicts for modifying properties HK6 through HK1 I are treated as for the first harmless conflict HK1. The harmless conflicts with relationship operations (HK4, HK5) in the history of the deleteElement operation no longer have any decision option for rejection and the decisions relating to the harmless relationship conflicts in the other copy database HK3, HK5 are minimized by the option of accepting and/or creating a new state. The critical conflicts with relationship operations in the copy database without the deleteElement operation are reduced by the option resetting and/or adopting the operations. Critical conflicts with property operations experience no modification to their property collection in this case either.

A common deleteElement operation contained in the common history GH and representing no conflict reduces the decision options in specific cases. Thus, all critical conflicts KK2 and KK3 with relationship operations in which the target data element of the common deleteRelationship operation corresponds to the data element deleted on both sides can no longer be reset.

Dependent conflicts with one or more relationship operations (HK3, HK4, HK5, KK1, KK2, KK3), i.e., with a plurality of listed identifiers and hence a plurality of data elements involved, can have a plurality of dependencies at the same time. In this regard, there may be just one dependency for each arising identifier in a conflict. A dependent conflict having a plurality of identifiers can firstly have a plurality of dependencies on conflicts of the same conflict type (for example, on two conflicts of the first harmless conflict HK1 a) and can secondly have a plurality of dependencies on conflicts of different conflict types (e.g., on a conflict of the type HK1 a and on a conflict of the type HK1 b). By way of example, a dependent conflict of the type HK3a can have two dependencies on two conflicts of the type HK1 a, namely one with the identifier id1 and one with the identifier id2. At the same time, the second critical contact KK2 can have a dependency on the second harmless conflict HK2a, on the first harmless conflict HK1 a and on the first harmless conflict HK1 B.

The dependency of the identifiers for a conflict of the type HK1 or HK2 means that there can be a maximum of three restrictions per conflict of the type HK5, KK1, KK2 or KK3. All conflicts of the type HK3A, HK3B, HK4A, HK4B, HK5A and HK5B can have a plurality of dependencies on conflicts of the same or different type at the same time. Conflicts of the types KK1, KK2, KK3A and KK3B, on the other hand, can have a plurality of dependencies on conflicts of different types at the same time. However, the same restrictions of the decision options may also arise a number of times for conflicts which have a number of dependencies on the same conflict type.

Thus, for a conflict of the type HK3A, two dependencies are possible at the same time in the presence of a conflict of the type HK1A or of one of the type HK2B and the decisions are each minimized by the first decision E1. The multiple restrictions arising for many dependent conflicts with the same decision options do not require any separate consideration. Each of these decision restrictions is considered as if it were an individual, specific limitation. Hence, all multiple restrictions, like others as well, are noted in the conflict. If a conflict of the type HK1 and HK2 is resolved such that one of the restrictions arising a number of times is eliminated, the rest of these restrictions are retained. Only when different conflict resolutions mean that there are no longer any of the multiple restrictions present can a decision of this type be made. This applies irrespective of whether the restriction was present once or a plurality of times.

The restrictions, recognized once at the start of reintegration, as a result of dependencies of the conflicts on conflicts of the type HK1 and HK2 are changed dynamically depending on the resolution of the conflicts of the type HK1 and HK2 during the reintegration. Thus, depending on the type of the dependent conflicts and on the respective resolution decision for the createElement operation and deleteElement operation, the following changes to the decision restrictions result:

a) The adoption of a createElement operation (first decision E1 relating to a conflict of the type HK1) causes the decision restrictions to be reset, i.e., the decision options to be extended, for all conflicts dependent on the operation.
b) The rejection of a deleteElement operation (second decision E2 relating to a conflict of the type HK2) likewise causes the decision restrictions to be reset, i.e., the decision options to be extended for the conflicts dependent on this conflict.
c) The rejection of a createElement operation (second decision E2 relating to a conflict of the type HK1) causes the decision restrictions already made for the conflicts dependent on this conflict to be retained. Hence, no decision options change.
d) The adoption of a deleteElement operation (first decision E1 relating to a conflict of the type HK2) causes the decision restrictions already made for the conflicts dependent on this conflict to be retained. Hence, no decision options change.

An anomaly created on one side can be recognized by way of two respective conflicts present in a history. In this context, there are the options of the conflict pairs HK5Aa/HK5Ab, HK4A/HK3A, HK4A/HK5A. In the case of a conflict of the type HK5Aa, the deleteRelationship operation is involved in the anomaly and in the case of a conflict of the type HK5Ab, the createRelationship operation is involved in the anomaly.

For anomalies arising on account of modifications on the copy database of the second user B, the same options apply: HK5Ba/HK5Bb, HK4B/HK3B, HK4B/HK5B. In this context, a common feature of all conflict pairs is that there is a deleteRelationship operation with an identifier id1 as a source data element and with an identifier id2 as a target data element in one of the two conflicts and the same identifiers arise in reverse as source data element and target data element in a createRelationship operation for the other conflict.

The adoption of the conflict of the one-sided anomaly, as described above, with the createRelationship operation prevents rejection of the conflict of the one-sided anomaly with the deleteRelationship operation for a rejection of the conflict of the one-sided anomaly with the deleteRelationship operation, but on the other hand prevents adoption of the conflict of the anomaly with the createRelationship operation. The change in one of the two conflicts does not reduce the decision options for the other conflict.

The result of this is that an anomaly created on one side in directed relationships can be resolved by rejecting the two conflicts, adopting the two conflicts, changing the two conflicts differently or modifying one of the conflicts and adopting or rejecting the other conflict.

An anomaly created on both sides in directed relationships can be resolved by deciding one of the two conflicts and deciding the other conflict in a different manner from this.

To prevent an anomaly (a "pseudo-anomaly") from arising, as described above, the following restrictions on the decision options are provided:

a) After adoption of a conflict with the createRelationship operation containing the common data element id1 as a target data element (createRelationship21), there must no longer be, for the conflict with the two createRelationship operations containing the common data element as source data element, any decision option of the sixth decision option E6 with replacement of the target data element (idx or idz) by the source data element id2(createRelationship21).
b) After a sixth decision E6 has been made on the basis of the sixth decision option E6 and selection of a new target data element id2 for the conflict with the two createRelationship operations containing the common data element id1 as a source data element, no further adoption of the conflict with the createRelationship operation with the common data element id1 as a target data element (createRelationship21) must be possible.

As described above, as part of this method, the decision options for conflicts are limited on the basis of their dependencies, anomalies and pseudo-anomalies. After each decision relating to a conflict, a change to the decision options for the conflicts which are dependent on the conflict just resolved or are situated in a common anomaly or pseudo-anomaly with this conflict is made on the basis of the dependencies, anomalies and pseudo-anomalies.

A decision is made for each conflict, as described above. The decision can be made in different ways. An overview of possible decision variations can be found in '132. Within the scope of this illustrative embodiment, provision is made for a database or copy database to be regarded as a reference database, and for the adjustment to be carried out on the basis of the reference database.

Figure 1:
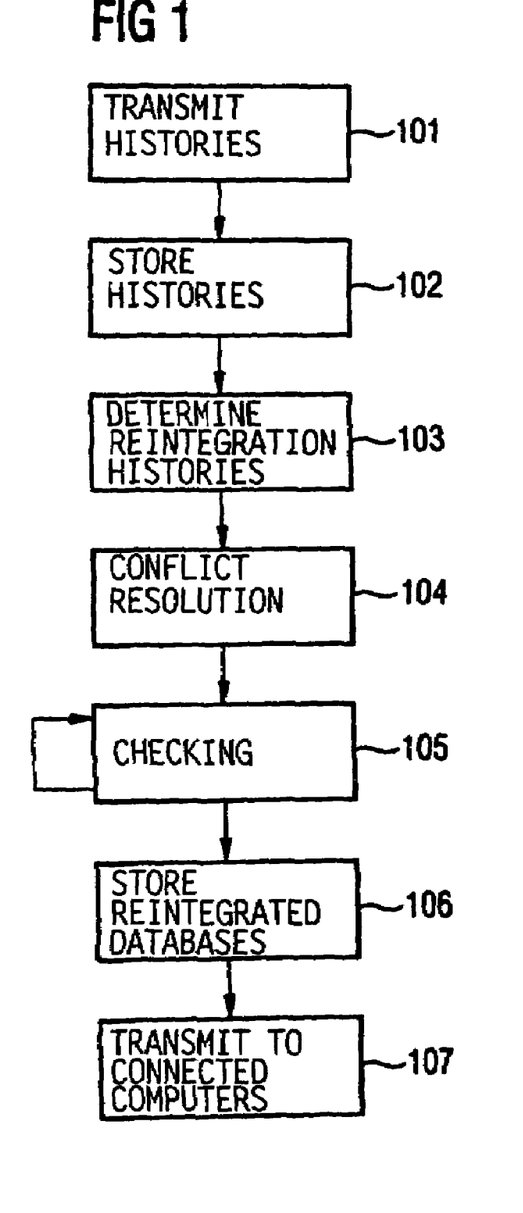
FIG. 1 is a flowchart showing the method steps of the illustrative embodiment.

Thus, as shown in FIG. 1 by way of a recursive loop via a checking step (step 105), a check is made to determine whether there is still any conflict and whether a decision thus needs to be made, and to make this decision if needed. If there are no more conflicts present, then a last method step (step 106) is carried out, storage of the reintegrated database, which contains no more inconsistencies.

The inconsistency-free database is again transmitted to all further computers connected to the first computer 200 (step 107). All the computers therefore have a consistent copy database.

The following text illustrates a few alternatives to the illustrative embodiment described above. Inconsistencies can also be recognized after a prescribable number of elimination operations carried out for an inconsistency by searching for a further inconsistency. This can be extended such that, each time an inconsistency has been eliminated, a subsequent inconsistency is again sought and eliminated. It is also possible for the first computer to use the method illustrated above to ascertain a series of correction commands (correction sequences) which is respectively transmitted to the computer whose copy database has been checked for inconsistencies, and for the respective computer to use the correction sequence to adjust its copy database to the database.

In addition, in one alternative embodiment, it is likewise possible to leave the decision to a user or to a plurality of users, i.e., the decision options are displayed to a user on the screen and the user uses the keyboard or the computer mouse to select the decision he requires, which is then implemented by the computer.

The above-described method and arrangement are illustrative of the principles of the present invention. Numerous modifications and adaptations thereof will be readily apparent to those skilled in this art without departing from the spirit and scope of the present invention.

What is claimed is:

1. A method for a computer-aided elimination of at least one inconsistency in a database collection containing a database and at least one copy database of the database, comprising:
    changing said database or said at least one copy database, thereby producing an inconsistency;
    allocating at least some operations which create an inconsistency to defined conflict types;
    allocating each conflict type a decision set which is used to indicate possible decisions which can be used to eliminate an inconsistency created by at least one operation of said respective conflict type;
    eliminating said inconsistency utilizing said decision set;
    ascertaining a plurality of inconsistencies and their dependencies on one another before eliminating said inconsistency; and
    automatically modifying, while eliminating the inconsistency, said decision set for at least one conflict type based on dependencies of said inconsistencies such that a future conflict is eliminated by a modified method.

2. The method as claimed in claim 1, further comprising the step of eliminating additional inconsistencies.

3. The method as claimed in claim 1, further comprising the step of allocating each conflict type a decision set which is used to indicate possible decisions which can be used to eliminate an inconsistency created by additional operations of the respective conflict type.

4. The method as claimed in claim 1, wherein said database collection contains a plurality of copy databases of said database.

5. The method as claimed in claim 1, further comprising the step of ascertaining a conflict, an anomaly, or a pseudo-anomaly when an inconsistency is ascertained.

6. The method as claimed in claim 2, further comprising the step of examining, after a prescribable number of eliminated inconsistencies, said database collection for further inconsistencies and their dependencies, anomalies and pseudo-anomalies.

7. The method as claimed in claim 1, wherein said database collection contains an object-oriented database.

8. The method as claimed in claim 1, further comprising the step of applying said method in a context of object-oriented software development.

9. The method as claimed in claim 1, further comprising the step of applying said method in a context of creating a structured electronic document.

10. A system for eliminating at least one inconsistency in a database collection containing a database and at least one copy database of said database, which inconsistency arises on account of the database or said at least one copy database being changed, comprising:
    a processor configured to:
        allocate at least some operations which create an inconsistency to defined conflict types;
        allocate to each conflict type a decision set which is used to indicate possible decisions which can be used to eliminate an inconsistency created by at least one operation of said respective conflict type; and
        eliminate said inconsistency using said decision set
    wherein said processor determines a plurality of inconsistencies and their dependencies on one another before the inconsistency is eliminated;
    wherein said processor modifies, during elimination of said inconsistency, a decision set for at least one conflict type based on the dependencies of said inconsistencies such that a future conflict is eliminated by a modified method.

11. The system as claimed in claim 10, wherein said processor is configured to eliminate a plurality of inconsistencies.

12. The system as claimed in claim 10, wherein said processor is configured to allocate each conflict type a decision set which is used to indicate possible decisions which can be used to eliminate an inconsistency created by a plurality of operations of said respective conflict type.

13. The system as claimed in claim 10, wherein said processor is configured to operate a database collection that contains a plurality of copy databases of said database.

14. The system as claimed in claim 10, wherein said processor is configured to a certain a conflict, an anomaly or a pseudo-anomaly when an inconsistency is ascertained.

15. The system as claimed in claim 11, wherein said processor is configured to examine, after a prescribable number of eliminated inconsistencies, said database collection for further inconsistencies and their dependencies, anomalies and pseudo-anomalies.

16. The system as claimed in claim 10, wherein said processor is configured to operate on said database collection that contains an object-oriented database.

17. The system as claimed in claim 12, wherein said processor is configured to operate in a context of object-oriented software development.

18. The system as claimed in claim 10, wherein said processor is configured to operate in a context of creating a structured electronic document.

19. A set of a plurality of systems for eliminating at least one inconsistency in a database collection containing a database and at least one copy database of said database, which inconsistency arises on account of said database or said at least one copy database being changed, comprising;
    a plurality of processors, wherein each system has at least one processor which is configured to:
        allocate at least some operations which create an inconsistency to defined conflict types;
        allocate to each conflict type a decision set which is used to indicate possible decisions which can be used to eliminate an inconsistency created by at least one operation of said respective conflict type; and
        eliminate said inconsistency using said decision set;

said systems being configured to be coupled to one another to determine a plurality of inconsistencies and their dependencies on one another before the inconsistency is eliminated;

wherein said processors modify, during elimination of said inconsistency, a decision set for at least one conflict type based on the dependencies of said inconsistencies such that a future conflict is eliminated by a modified method.

* * * * *